Nov. 27, 1945.  L. L. DOLLINGER  2,389,603
FLOW INDICATOR
Filed Feb. 1, 1944  2 Sheets-Sheet 1
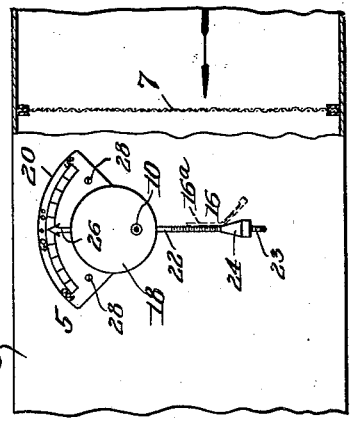
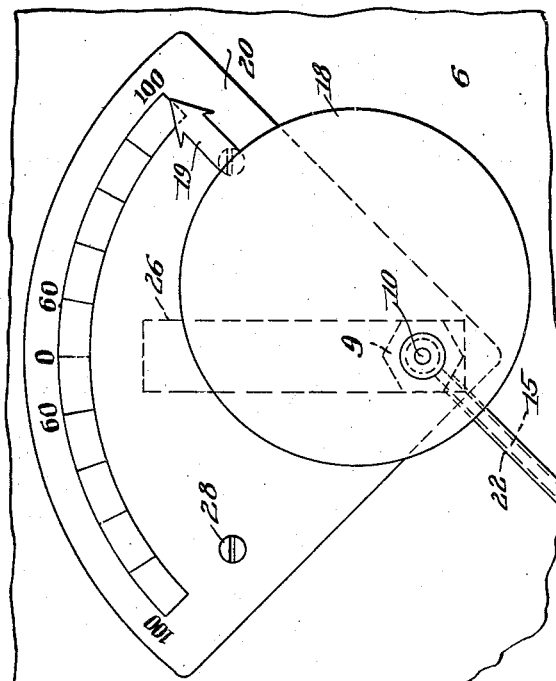
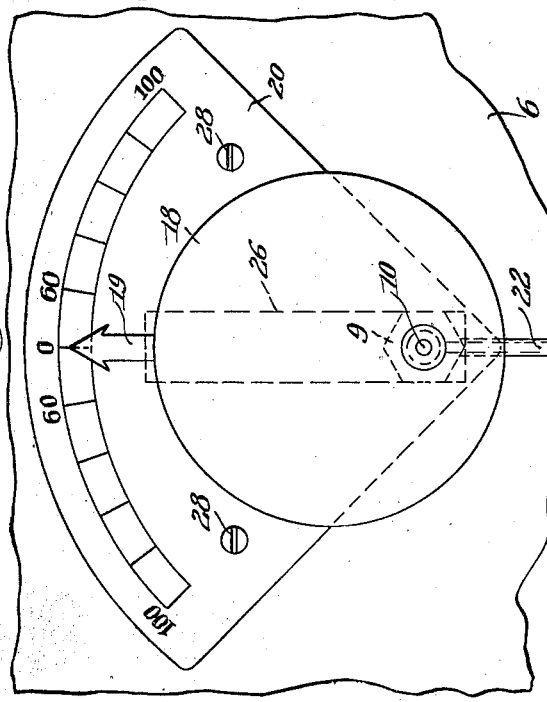
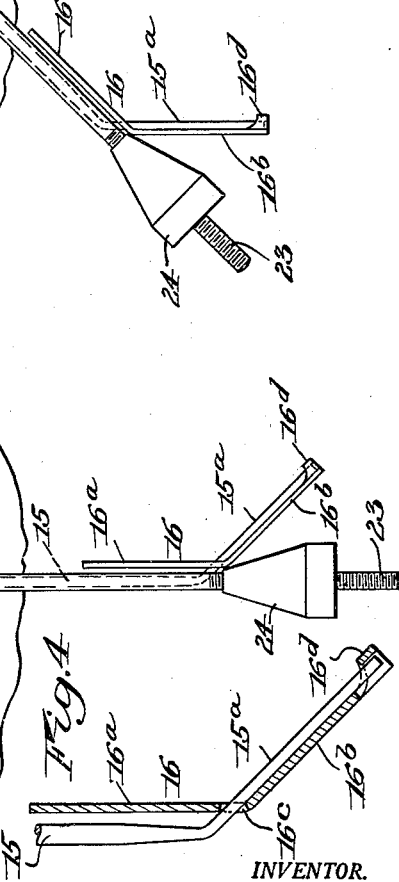
INVENTOR.
Lewis L. Dollinger
BY D. Clyde Jones
his Attorney

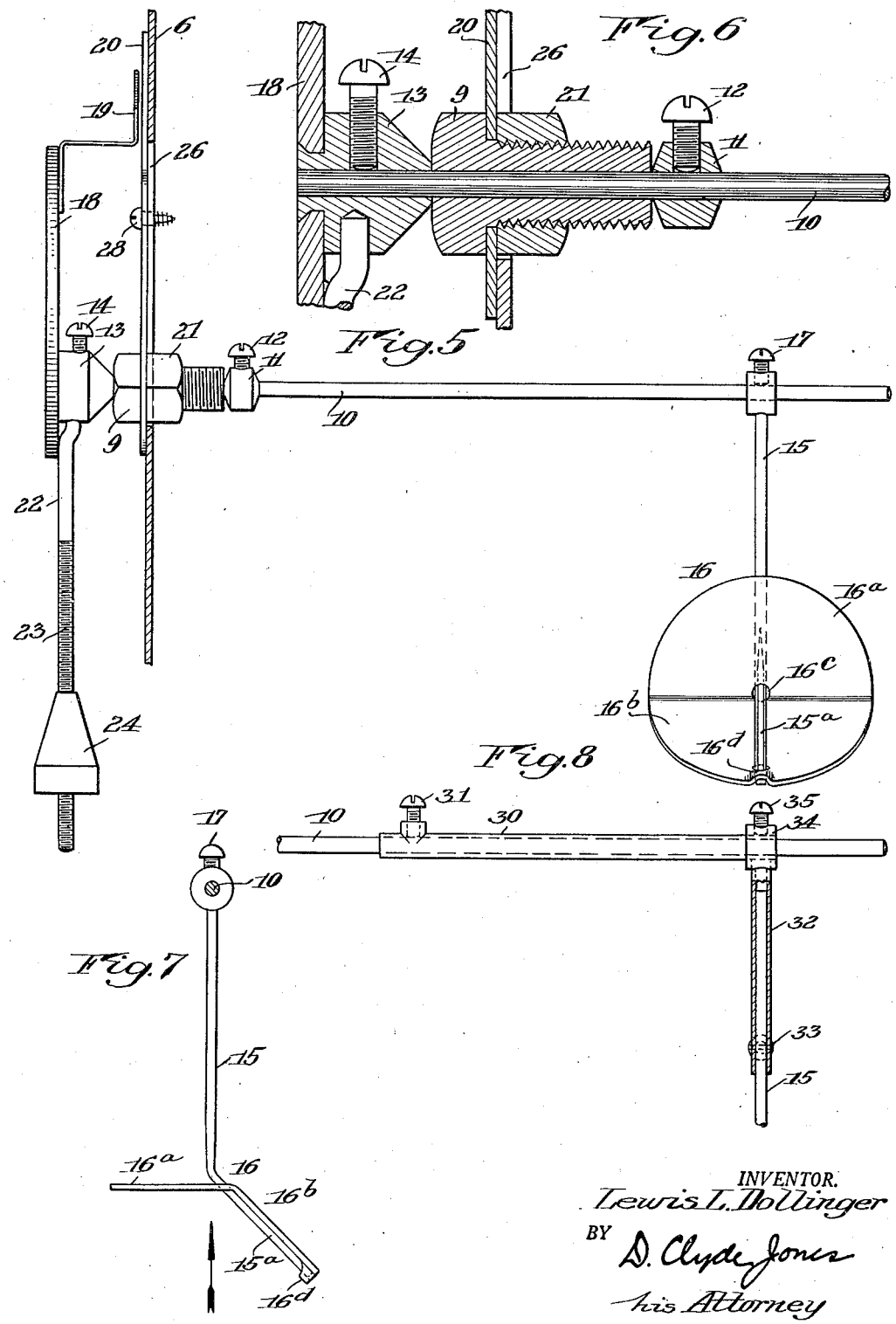

Patented Nov. 27, 1945

2,389,603

UNITED STATES PATENT OFFICE 2,389,603

FLOW INDICATOR

Lewis L. Dollinger, Rochester, N. Y., assignor to Dollinger Corporation, Rochester, N. Y., a corporation of New York Application February 1, 1944, Serial No. 520,708

3 Claims. (Cl. 73—228)

This invention relates to flow indicators and the like.

It is frequently desirable to filter a fluid, such as air or liquid, passing through a duct, but after the lapse of time, the filter becomes choked with foreign matter so that the flow of the fluid tends to be greatly retarded. Where such a filter is introduced in one of the air pipes of a household heater or furnace, the user does not practice routine cleaning or renewal of the filter and since the filter is usually out of sight, the user does not notice the restricted flow of hot air until the efficiency of the heating system is greatly reduced.

The present invention has as its main feature the provision of a simple, inexpensive indicator which shows the efficiency of a filter as it drops from its maximum efficiency to a minimum value where the filter unit should be cleaned or renewed.

In accordance with another feature of the invention, the indicator is arranged for easy installation in a duct system without disassembling any part of the system.

In accordance with another feature of the invention, the indicator is so constructed that it can be quickly changed for use either in a vertical duct or in a horizontal duct, as conditions may demand.

In the drawings:

Fig. 1 is a front elevation of the indicator of the present invention mounted on a fragment of a duct, a wall of which is broken away to indicate the location of a filter unit;

Fig. 2 is a front elevation of the present indicator mounted on a duct, especially indicating the position of movable indicator parts when no fluid is flowing through the duct;

Fig. 3 is a view similar to that of Fig. 2, of the indicator mounted on a duct except that in this instance the indicator shows that fluid is flowing through the duct and that the filter is permitting its maximum flow therethrough;

Fig. 4 is a sectional detail view through the vane particularly illustrating how the vane is detachably mounted on its support;

Fig. 5 is a side elevation of the present indicator illustrated apart from the duct;

Fig. 6 is a longitudinal section through the bearing of the indicator;

Fig. 7 shows the mounting of the vane on its support for indicating vertical flow as distinguished from the mounting of this vane in Fig. 5 where it is adapted to indicate horizontal flow;

Fig. 8 is a fragmentary detail view illustrating how certain parts of the indicator can be modified so that these parts can be adjusted to fit in ducts of various dimensions.

As shown especially in Fig. 1, the indicator, generally designated 5, is mounted on a side wall of a pipe or duct 6 through which a fluid, such as air or liquid, passes after flowing through a suitable filter 7. It will be understood that as the filter 7 is used, it gradually becomes choked with foreign matter present in the fluid supplied thereto. Since this filter is located within the duct, it is usually in a position where its condition cannot be readily observed. Therefore, the indicator 5 of this invention is provided to give an indication of the flow through the filter, which indication shows the condition of the filter. This indicator, as best illustrated in Figs. 5 and 6, includes a bearing 9 which serves as a support for shaft 10. A collar 11, locked by a set screw 12, on shaft 10, limits endwise movement of the shaft in one direction with respect to the bearing. A similar collar 13, locked by a set screw 14 on the shaft, limits the movement of the shaft in the other direction. However, the shaft can rotate freely in the bearing. On the right hand end of the shaft, as illustrated in Fig. 5, there is adjustably mounted a rod 15 which projects at right angles to the shaft, the parts being locked in adjusted position by set screw 17. The lower portion 15a of this rod, which is inclined at an angle of approximately 135 degrees to the main portion thereof, supports a vane 16. This vane, as herein illustrated, comprises a disc bent along its diameter into two portions 16a and 16b inclined at an angle of 135 degrees with respect to each other so that the vane presents substantially equal effective areas irrespective of the amount that the vane has been rotated by the shaft 10. The vane 16 is mounted on the support 15 in the position shown in Figs. 2, 3, 4 and 5 when the indicator is utilized in a horizontal duct. However, when the indicator is to be used in a vertical duct, the vane must be mounted on its support 15, in the position shown in Fig. 7. It will be noted that in both situations, namely with a horizontal duct and with a vertical duct, the vane 16 is so mounted on the support 15, that the vane area 16a normally extends perpendicular to the direction of flow through the duct. Since it is thus necessary to change the relation of the vane with respect to its support, the vane must be conveniently detachable therefrom. While various arrangements may be used for this purpose, it is herein illustrated that the vane is sprung on the support and therefore is frictionally retained thereon. As best illustrated in Fig. 4, the lower or angular portion 15a of the support is inserted through the central opening 16c in the vane and also through the perforated up-turned lug 16d on the vane. These parts of the vane are so shaped that the rod portion 15a is slightly sprung in mounting the vane thereon.

The previously mentioned collar 13 has secured to its front face, a disc 18 which therefore extends at right angles to the shaft 10. This disc, at its upper part, carries an index or pointer 19 adapted to sweep over a graduated scale plate 20 suitably supported on a fixed part of the indicator. Since the indicator is to be used in various positions in a duct, the graduated scale on plate 20 has zero in the center with other graduations of increasing value at each side thereof, terminating in the maximum value of one hundred. As herein illustrated, the plate 20 has an opening therein through which a portion of the bearing 9 passes, while a lock nut 21 threaded on the bearing locks this plate against the head of the bearing. The collar 13, in addition to carrying the disc 18, also carries a downwardly extending rod 22 threaded at its lower portion, as indicated at 23, to receive the internally threaded weight or counterbalance 24.

Since the indicator must frequently be applied to a duct already in service, should be pointed out how it can be readily mounted in the duct without disconnecting any part of the duct. It is merely necessary to cut a rectangular opening 26 in a side wall of the duct, as best shown in Figs. 2 and 3. This opening is of convenient length to receive the shaft 10 with the support 15 and vane 16 mounted thereon, while the width of the opening is such that the lock nut 21 can pass therethrough with the mentioned parts projecting into the duct, as just described. The indicator can be fastened in position by attaching the scale plate 20 to the side wall of the duct as by screws 28.

In the modified form of the invention illustrated in Fig. 8, provision is made for adjusting the actuating parts of the indicator to operate in ducts of different cross section. To this end, there is telescopically mounted on the shaft 10, a sleeve 30 arranged to be locked by the set screw 31, in various positions on the shaft. In addition, the vane support 15 is adjustable lengthwise in a tubular member 32, the parts being held in adjusted position by set screw 33. The upper end of member 32 is provided with a fitting 34 through which the sleeve 30 extends in a direction at right angles to the member 32. A set screw 35 locks these last-named parts in the position desired. By this construction, the indicator is applicable to a wide range of duct sizes.

In the operation of the indicator, the stream of filtered fluid will strike the faces 16a and 16b of the vane 16. This vane, through its support 15, rotates the shaft 10, which, in turn, rotates the disc 18 and its index or pointer 19 to the position shown in Fig. 3, as long as the filter is operating at its rated efficiency. In the course of use as the filter becomes clogged by foreign matter, it will tend to obstruct the flow of fluid therethrough, which results in a reduced velocity of the current flowing through the duct. Consequently, less force will be exerted against the faces 16a and 16b of the vane so that the index instead of pointing to graduation "100," as in Fig. 3, will point to some lesser value, for example, the right hand graduation "60" which may serve to indicate that the filter is so clogged with foreign matter that it should be cleaned or replaced. It will be understood that when no current is passing through the duct, the weight 24 tends to hold the parts of the indicator in the position shown in Fig. 2 wherein the index points to zero.

Although preferred embodiments of the present invention have been discussed, it will be understood that other modifications may be made within the spirit and scope of the appended claims.

What I claim is:

1. In combination with a duct through which a stream of fluid is adapted to flow, a flow indicator comprising a rotatable member extending into the duct, said member having a vane fixed thereon in angular relation thereto to extend into said stream, said vane being bent medially thereof about an axis parallel to said member to provide two portions exposed to said stream and inclined with respect to each other whereby the vane presents substantially equal effective areas to the stream irrespective of the amount that the vane has been rotated, and means for normally supporting one of said portions in a plane substantially normal to the direction of flow of the stream.

2. In combination with a duct through which a stream of fluid is adapted to flow, a flow indicator comprising a rotatable member extending into said duct, a support carried by and projecting away from the portion of said member within the duct, the projecting end portion of said support being inclined with respect to the remainder thereof, a vane having two surfaces inclined with respect to each other about an axis parallel to said member, said vane being detachably positioned on said support in either one of two positions so that a surface thereof in its inactive position is normal to the stream when the indicator is used in a horizontal duct and also when the indicator is used in a vertical duct.

3. In a flow indicator, a plate adapted to be fastened to the wall of a duct over an opening therein to close said opening, a bearing mounted on said plate, a shaft rotatable in said bearing and adapted to extend through said opening, a support carried by and projecting away from the portion of the shaft within the duct, the projecting end portion of said support being inclined with respect to the remainder thereof, a vane having two surfaces inclined with respect to each other about an axis parallel to said shaft, said vane being detachably positioned on said support in either one of two positions so that a surface thereof in its inactive position is normal to the stream when the indicator is used in a horizontal duct and also when the indicator is used in a vertical duct, the opening in said duct being of a size to receive said vane therethrough in its mounted operative condition, and an index secured to the other end of said shaft for movement relative to said plate.

LEWIS L. DOLLINGER.